(12) United States Patent
Komowski

(10) Patent No.: US 6,319,112 B2
(45) Date of Patent: Nov. 20, 2001

(54) AIR FLAP FOR A VENTILATION, HEATING OR AIR CONDITIONING SYSTEM OF A MOTOR VEHICLE

(75) Inventor: Michael Komowski, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/731,229

(22) Filed: Dec. 7, 2000

(30) Foreign Application Priority Data

Dec. 7, 1999 (DE) .............................. 199 58 844
Oct. 30, 2000 (DE) .............................. 100 53 814

(51) Int. Cl.$^7$ ............................................. B60H 1/00
(52) U.S. Cl. ............................................. 454/139
(58) Field of Search .................. 454/139, 121, 454/125, 127; 251/298

(56) References Cited

U.S. PATENT DOCUMENTS

| 5,391,112 | * | 2/1995 | Wardlaw | 454/139 |
| 5,836,813 | * | 11/1998 | Miyata et al. | 454/139 |
| 5,876,277 | * | 3/1999 | Uemura et al. | 454/139 |
| 6,113,483 | * | 9/2000 | Schambre et al. | 454/121 |

FOREIGN PATENT DOCUMENTS

| 42 14 862 | 5/1993 | (DE) . |
| 42 28 866 | 3/1994 | (DE) . |
| 2 771 966 | 6/1999 | (FR) . |
| 2 328 012 | 2/1999 | (GB) . |

* cited by examiner

*Primary Examiner*—Harold Joyce
*Assistant Examiner*—Derek S. Boles
(74) *Attorney, Agent, or Firm*—Foley & Lardner

(57) ABSTRACT

The invention relates to an air flap for a ventilation, heating or air conditioning system of a motor vehicle. The flap has a shut-off surface extending between two outer edges, each having a curved or vaulted profile. End sections of the first edge adjoin the end sections of the second edge, and the end sections are joined to a pivot axis. In order, in particular, to obtain a compact construction for the air conditioning system, the air flap preferably has a shape in which a first area (A) enclosed by the first, outer edge and the pivot axis is larger than a second area (B) enclosed by the second, outer edge and the pivot axis. An air flap of this type is used, in particular, as a fresh-air/circulating-air flap.

14 Claims, 9 Drawing Sheets

AIR FLAP FOR A VENTILATION, HEATING OR AIR CONDITIONING SYSTEM OF A MOTOR VEHICLE

BACKGROUND OF THE INVENTION

The invention relates to an air flap for a ventilation, heating or air conditioning system of a motor vehicle and to devices for guiding air using an air flap of this type.

German Patent Publication No. DE-A 42 28 866 (incorporated herein by reference) discloses a three-dimensional, in particular quadrant-shaped, pivotable air flap which is provided for optionally shutting off a fresh-air/circulating-air supply. An air flap formed in this manner together with its corresponding sealing elements is used for improved handling of the fresh-air flow which is obtained with high dynamic pressure.

French Patent Publication No. FR-A 2 771 966 discloses a pivotable, drum-shaped air flap with which different air ducts originating from a mixing space of an air-guiding housing of a vehicle air conditioning system can be shut off individually, depending in each case on the position of the air flap. In this arrangement, the drum-shaped air flap has circular-cylinder-shaped sections which are adjacent to one another in the direction of the pivot axis. At one end, the sections have a region which is bent inwardly and by means of which an air duct can be shut off in one of the end positions of the flap. This air flap has a very complicated geometric construction. Therefore, the flap is very expensive to produce. The flap only allows a very complicated guiding of air to the air duct, which can be covered by the angled region. As a result, the loss of pressure from the air directed into this air duct is very high. In addition, a relatively large amount of noise is produced because the air flow is deflected a number of times.

The general problem underlying current ventilation, heating or air conditioning systems along with their components, in particular the air flaps, is that the structural space which is available for the air conditioning system is very limited, and these systems therefore have to have an ever more compact structure.

Proceeding from the abovementioned prior art and from the problem of providing a heating or air conditioning system which is as compact as possible, one object of the invention is to provide an improved, pivotable air flap and devices for guiding air using this air flap.

SUMMARY OF THE INVENTION

According to one aspect of the present invention there has been provided an air flap for a ventilation, heating or air conditioning system of a motor vehicle, the air flap comprising: a pivotable blocking surface for blocking air flow, defined by a frame having first and second edges connected to the surface. The first and second edges have a vaulted profile, and each edge includes a pair of endpieces, each endpiece adjoining one of the pair of endpieces of the other edge at a pivot axis for the surface to thereby form the frame; and wherein a first area defined by the first edge and the pivot axis is greater than a second area defined by the second edge and the pivot axis.

In accordance with another aspect of the invention, there has been provided a system for guiding air in a ventilation, heating or air conditioning system of a motor vehicle, comprising: an air guiding housing; and an air flap comprising a pivotable blocking surface for blocking air flow, defined by a frame having first and second edges connected to the surface. The first and second edges have a vaulted profile and each edge includes a pair of endpieces, each endpiece adjoining one of the pair of endpieces of the other edge at a pivot axis for the surface to thereby form the frame; wherein a first area defined by the first edge and the pivot axis is greater than a second area defined by the second edge and the pivot axis; and wherein the air flap is mounted rotatably in the air-guiding housing to form a mixing flap for selectively closing off air flow.

According to still another aspect of the invention, there is provided a vehicle embodying the air control system described above.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiment shown in the drawings, which are briefly described below.

DETAILED DESCRIPTION OF PREFERRED EMBODIMENTS

Figure 1:
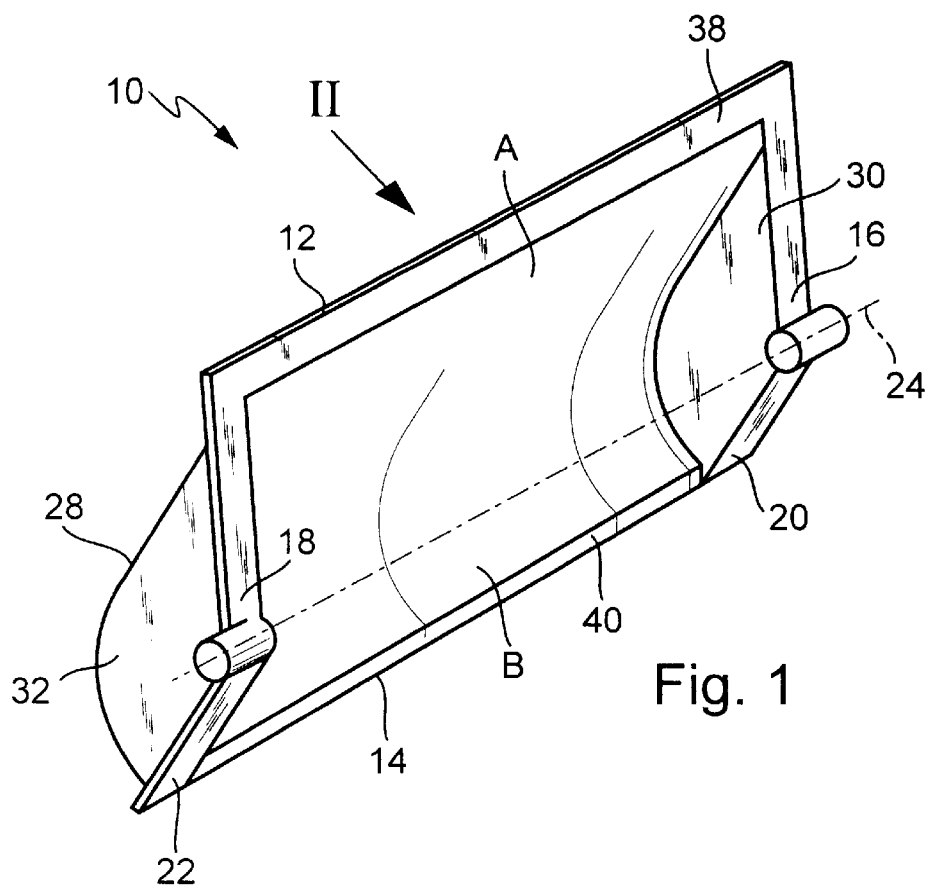
FIG. 1 is a perspective view of an air flap according to the invention.

The air flap according to the invention comprises a three dimensional shutoff surface extending between two outer edges having "curved" or "vaulted" profiles, the endpieces of the first edge adjoining the endpieces of the second edge, and all four end sections are jointed to a pivot axis. According to the invention, in this arrangement a first surface enclosed by the first outer edge and the pivot axis is larger than a second surface enclosed by the second outer edge and the pivot axis. The term "curved profile" or "vaulted profile" of the outer edges is to be understood as including a triangular, a rectangular, a circular-arc-shaped or oval configuration or similar configurations. The term "curved" or "vaulted" is therefore to be understood in its widest sense. This design has the great advantage of enabling the air flap to be adapted to the most varied structural spaces by adaptation of the surfaces mentioned and of the angle enclosed by the two edges. This substantial advantage becomes particularly apparent if the air flap is used as a circulating-air/fresh-air flap, as described below in the detailed description of the figures. By varying the surfaces mentioned and the enclosed angle, the position of the pivot axis and the openings of the flap in the two end positions can be adapted to the structural conditions. The air intake housing of a heating or air conditioning system is particularly subject to installation constraints, with the result that the flap according to the invention offers particular advantages in this sphere of use on account of its adaptability.

In an open position of the air flap according to the invention, a relatively large opening region can be freed, and in a closed position this region can be covered. It is possible to keep the structural space very small both in the open and in the closed position.

In a structurally simple refinement of the invention, side walls are provided and the shut-off surface is arranged between them. The air flap is then virtually in the shape of a dredging shovel.

The air flap can at the same time exert an air-guiding function by the shut-off surface, at least in some regions, by having a three-dimensional shape which is favorable for flow. For example, it can be arched, as a result of which the air flow can be guided in a less disturbed manner, resulting, in particular, in a lower amount of flow noise.

In a simple manner, and in order to free the greatest possible region in the open position, this three-dimensional region can be approximately in the shape of a sector of a cylindrical body. The three-dimensional region could be, for example, a sector of a circular cylinder. Alternatively, the shape could also be in the form of a quadrant of a sphere.

In an open position of the air flap, at least some regions of the air flap can bear against a housing wall, with the result that this region or the entire air flap does not impede the air flow in the open position.

For adaptation to given structural spaces and adaptation to openings which are to be covered by the air flap, in a development of the invention it would be possible for at least one of the curved edges to be non-planar.

If the shut-off surface comprises the three-dimensional region and a planar region which adjoins the latter and extends away from the pivot axis, an opening which is as large as possible and which is to be closed by the air flap can be covered. Depending in each case on the design of an air-guiding housing in which the air flap is arranged, the planar region can extend away radially or in a direction that is not strictly radial.

In order to obtain optimum sealing, so that no escaping air is able to flow past the air flap, the edges of the air flap preferably have sealing elements which preferably extend away radially and can optionally interact with sealing elements which run in the radial direction and are arranged on the air-guiding housing.

One sphere of use of the air flap according to the invention is as a mixing flap or hot air flap, in which the air flap according to the invention is mounted pivotably in the air-guiding housing and is provided in order to shut off the air from or to a heat transfer device, in particular a heater. In this arrangement, the air flap is advantageously arranged downstream of the heat transfer device, and the pivot axis is arranged at the air outlet. This arrangement permits an extremely compact construction of the heating or air conditioning system.

A particularly preferred sphere of use involves an air intake device for a ventilation, heating or air conditioning system of a motor vehicle having a circulating-air inlet and a fresh-air inlet. When the air flap according to the invention is used in this case as a circulating-air/fresh-air flap, the adaptability to given structural spaces has a particularly advantageous effect.

As shown in FIG. 1, an air flap 10 includes a frame having two outer edges 12 and 14. Each edge 12, 14 includes a pair of endpieces 16, 18 and 20, 22. Endpieces 16 and 18 of the first edge 12 are connected to endpieces 20 and 22 of the second edge at a pivot axis 24. As can be seen from FIG. 2 and as is indicated by dashed-dotted lines 26, the term "curved profile" is to be construed broadly. The frame and the outer edges 12 and 14 may have a triangular, rectangular, circular arc-shaped, oval or similar configuration. A shut-off or blocking surface 28 extends between the outer edges 12 and 14. In the exemplary embodiment illustrated in FIGS. 1 and 2, the air flap 10 also includes side walls 30 and 32 and the shut-off surface 28, which is shaped three-dimensionally and is in the shape of a sector of a cylindrical body, is arranged between the side walls. In this case, the pivot axis 24 forms the cylinder axis. As can be seen from the cross-sectional illustration of FIG. 3, a subsection 34 of the blocking surface 28 has a circular cylindrical design and is adjoined by a linear section 36.

Sealing elements 38 and 40 are arranged on the outer edges 12 and 14 to prevent air from escaping during use of the air flap 10 as described below. The sealing elements 38 and 40 preferably extend radially outward away from the pivot axis 24.

The first outer edge 12 encloses, with the pivot axis 24, a first area A. The second outer edge 14 encloses, with the pivot axis 24, a second area B, which lies perpendicular to the elevation plane shown in FIG. 2. According to the invention, the area A is larger than the area B. The air flap 10 is therefore of asymmetrical design when viewed in a direction parallel to the pivot axis 24 such as, for example, shown in FIG. 3. Generally, the air flap 10 is approximately configured in the shape of a dredging shovel.

A great variety of embodiments of the air flap 10 come within the scope of the invention. Various embodiments are illustrated in FIGS. 4 to 16. In the embodiments shown in FIGS. 4 to 7, reference numbers larger than 100 are used. The reference numerals may include the same last two digits that were used for similar parts corresponding to the first embodiment, so that reference may be made to the description of the first embodiment. However, the embodiments shown in FIGS. 4–15 differ from the first embodiment, for example, through the shape of the outer edges and the shape of the shut-off surface.

Figure 4:
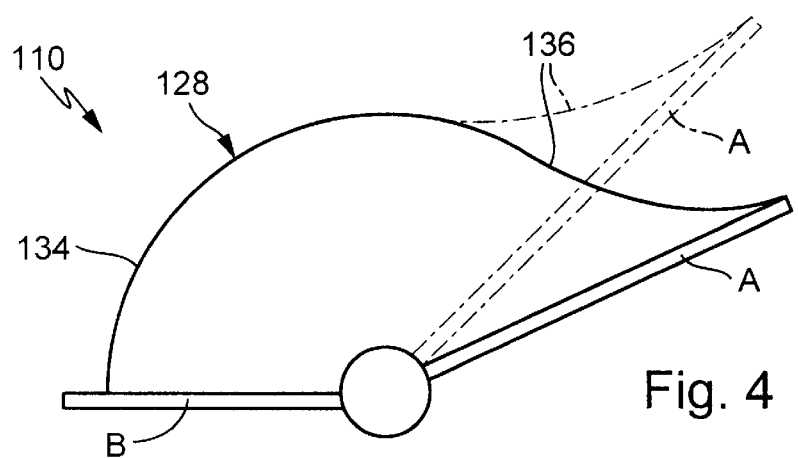
FIG. 4 is a side view in elevation of an alternative embodiment of an air flap according to the invention.
Figure 9:
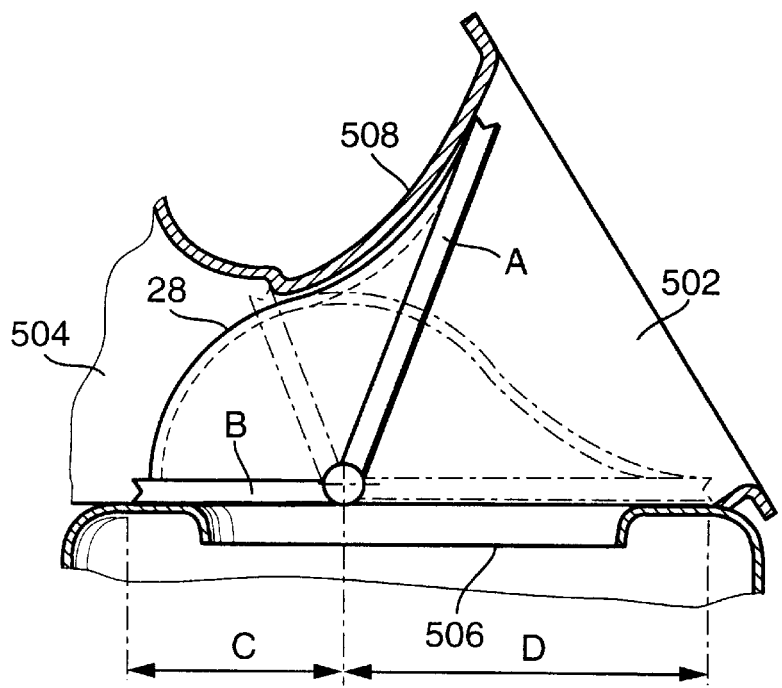
FIG. 9 is a partial cross-sectional view of an air intake housing, having an air flap according to the invention.

The air flap 110 illustrated in FIG. 4 has a blocking or shut-off surface 128 having a circular cylindrical section 134. Instead of a linear section, the surface 128 includes a curved section 136 whose curvature is opposite to the curvature of the section 134. This type of profile for the shut-off surface 128 can be favorable for flow, as shown in FIG. 9, for example. Two different curvatures of the curved section 136 are also illustrated in FIG. 4.

Figure 5:
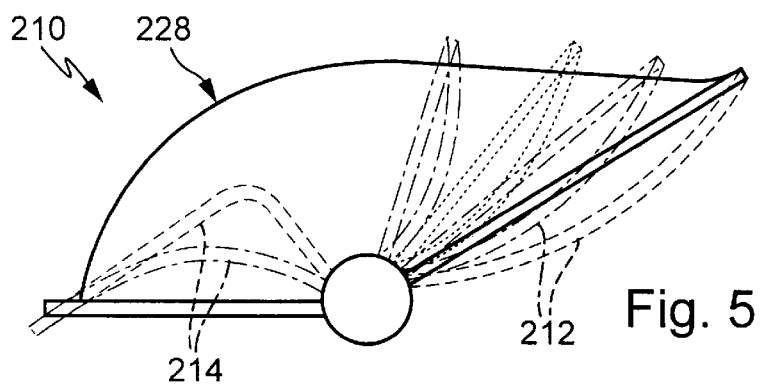
FIG. 5 is a side view in elevation of another alternative embodiment of an air flap according to the invention.

As show in FIG. 5, it is possible to modify an air flap 210 whose shut-off surface 228 is designed as in the first embodiment, to include outer edges 212 and 214 which do not have a planar profile as shown by the dashed lines in FIG. 5.

Figure 6:
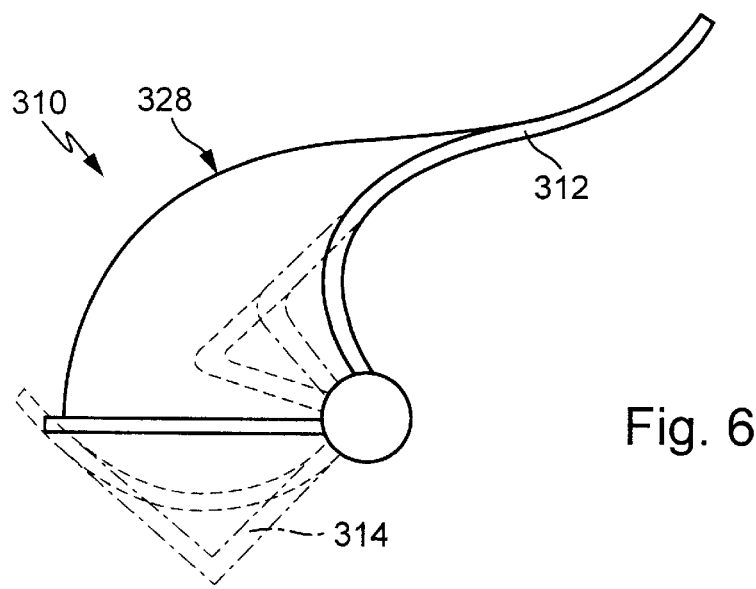
FIG. 6 is a side view in elevation of still another alternative embodiment of an air flap according to the invention.
Figure 16:
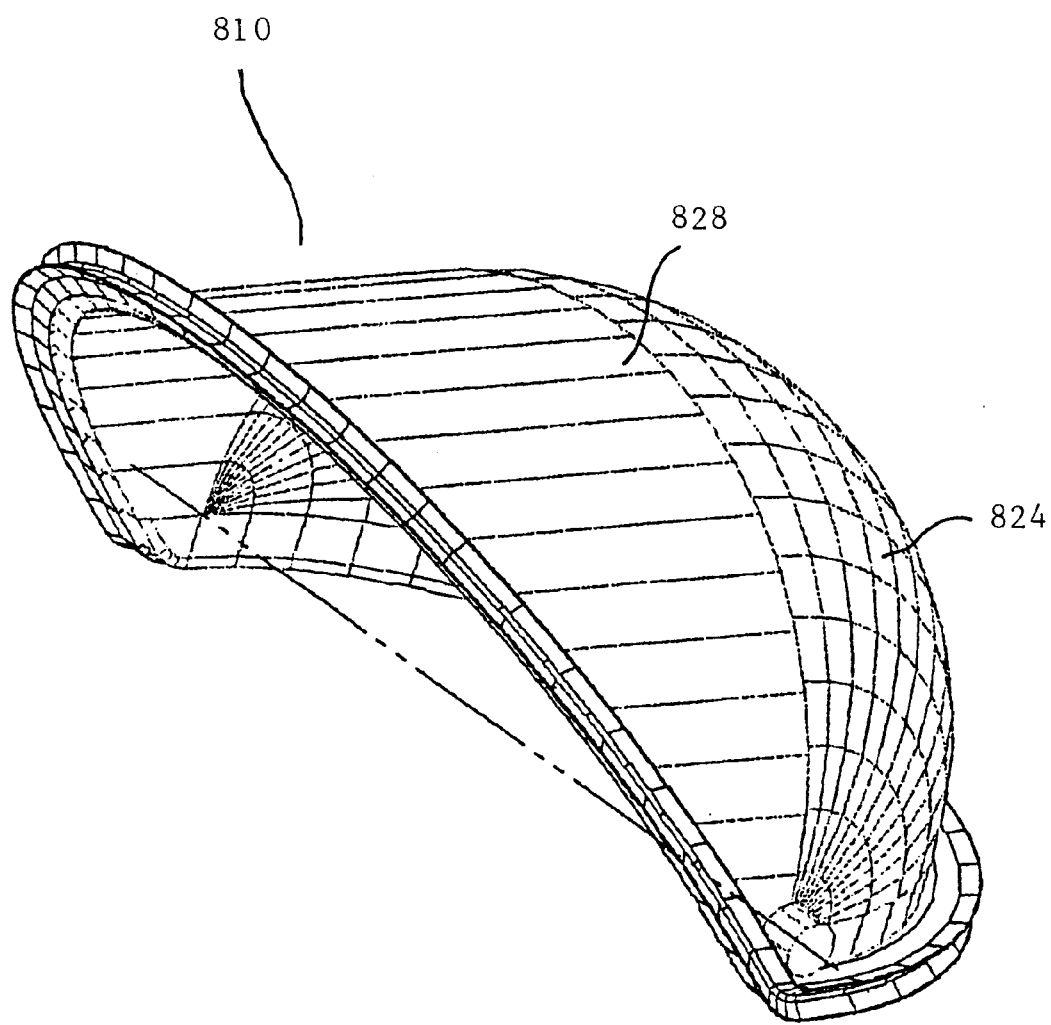
FIG. 16 is a perspective view of an air flap including a blocking surface with a curved region in the shape of a quadrant of a sphere.

FIG. 6 illustrates an air flap 310 having edges 312 and 314 which do not have a planar profile. In addition, a shut-off surface 328 is shown that has two different curvatures. As shown in FIG. 16, an air flap 810 may include a blocking surface 828 with a curved section 824 in the shape of a quadrant of a sphere.

Figure 3:
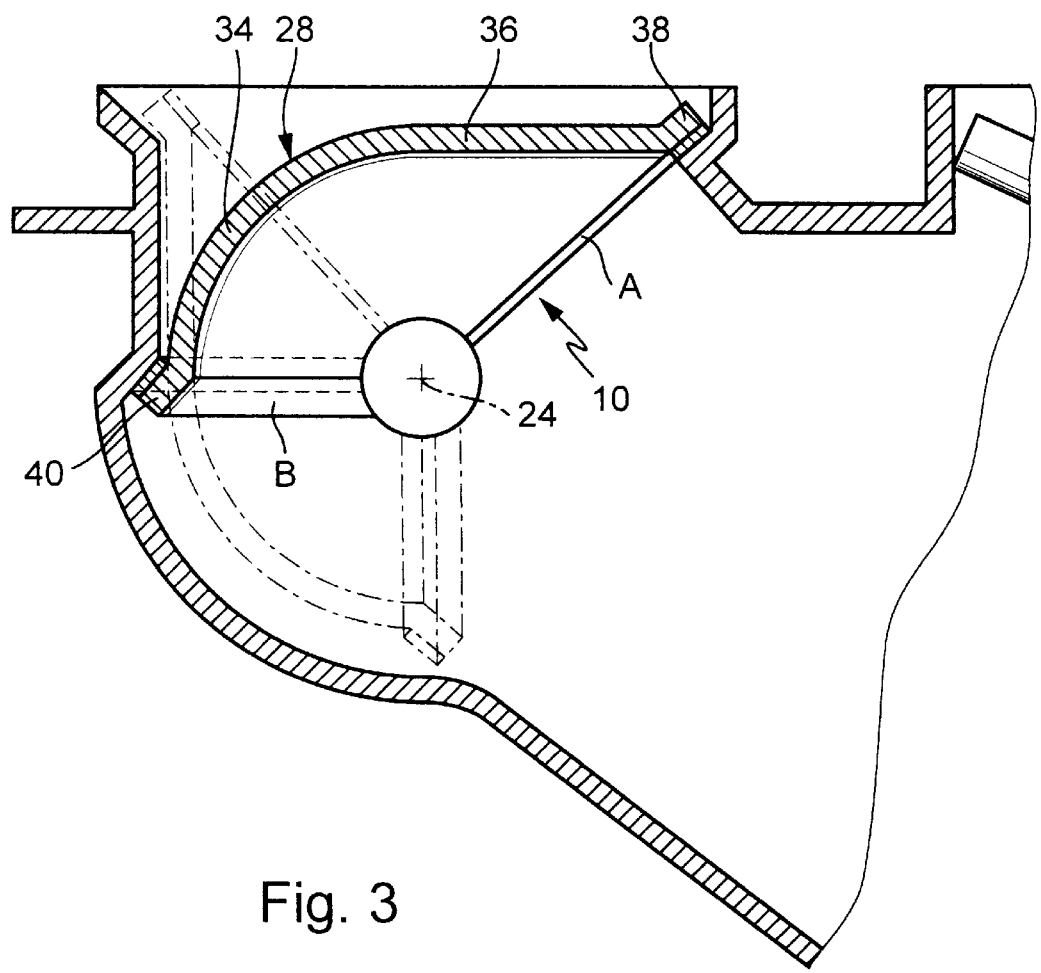
FIG. 3 is a partial cross-sectional view of a housing of a heating or air conditioning system having an air flap according to FIG. 1.
Figure 7:
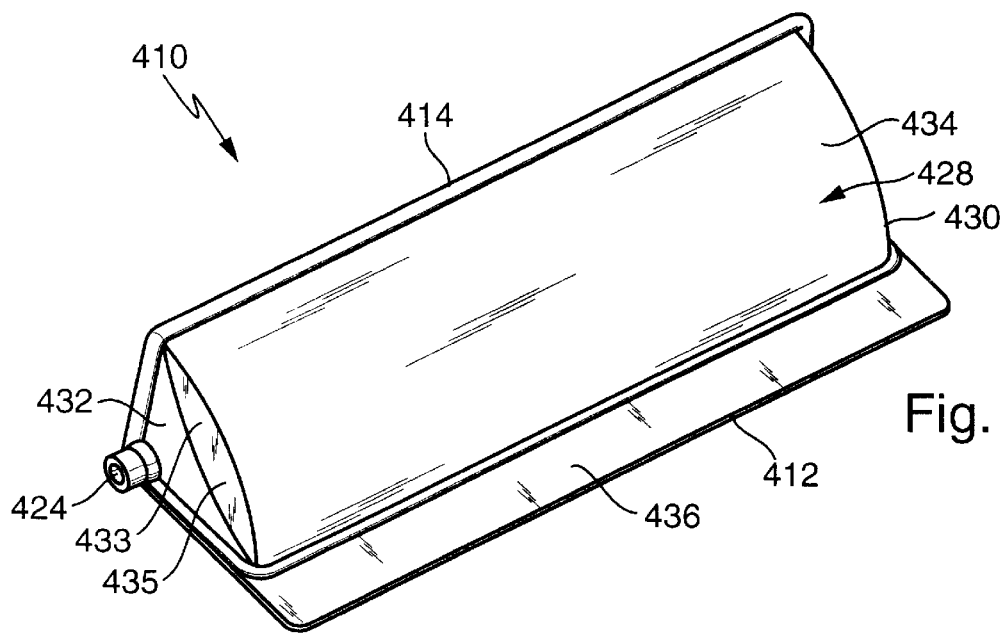
FIG. 7 is a perspective view of an alternative embodiment of the present invention.

FIG. 7 illustrates an air flap 410 whose blocking or shut-off surface 428 has a circular cylindrical section 434 and a linear section 436. However, the linear section 436 does not extend as a tangential extension of the circular cylindrical section 434, as is the case in the first exemplary embodiment as shown in FIG. 3. Instead, the linear section 436 lies in the plane defined by the outer edge 412 and the pivot axis 424. The air flap 410 includes an air-directing element 435 which arches in the opposite direction to the arching of the circular cylindrical section 434. See also FIG. 14. The side walls 430 and 432 include openings 433 which are merely provided in order to facilitate manufacturing the air flap 410 in a simple manner by injection molding.

The frame can be configured so that the angle between the first and second outer edges (at the pivot point) varies over a large range. In general the angle between the outer edges varies from about 80 to 180 degrees. For example, as shown in FIG. 4, the angle may approach 180 degrees. Alternatively, as shown in FIG. 6 the angle between the outer edges 312, 314 approaches more closely to 90 degrees. Most preferably, the angle is between 90 and 110 degrees.

The air flap according to the invention is preferably used in air intake housings of heating or air conditioning systems of motor vehicles. FIGS. 8 to 12 show a number of exemplary embodiments of an intake housing 500 which in each case has a fresh-air inlet 502, a circulating-air inlet 504 and an intake opening 506 for a radial fan (not shown). The air flap according to the invention is used for optionally closing the fresh-air inlet 502 or the circulating-air inlet 504.

Figure 2:
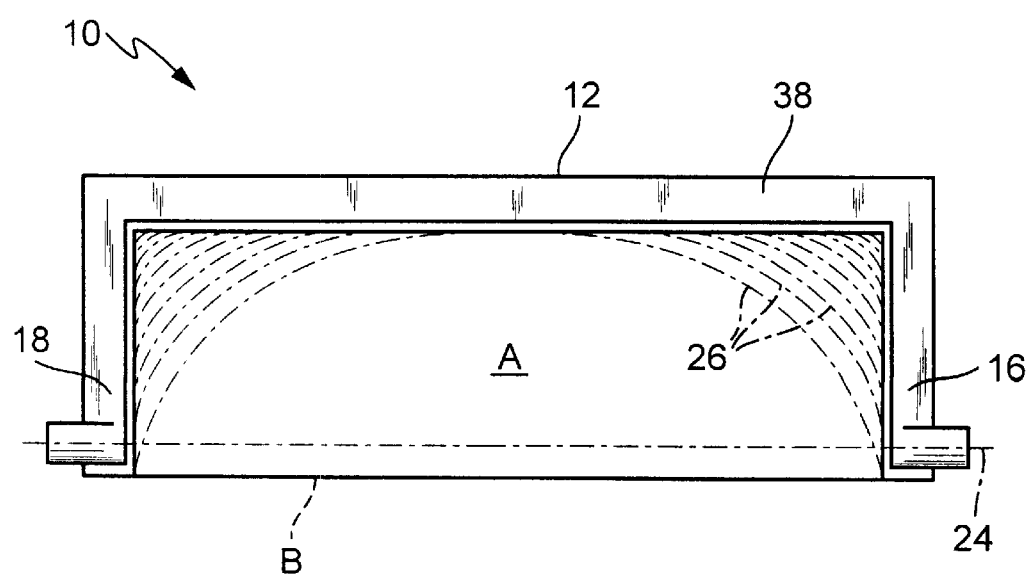
FIG. 2 is a view in elevation of the air flap of FIG. 1 in the direction line II—II from FIG. 1.
Figure 8:
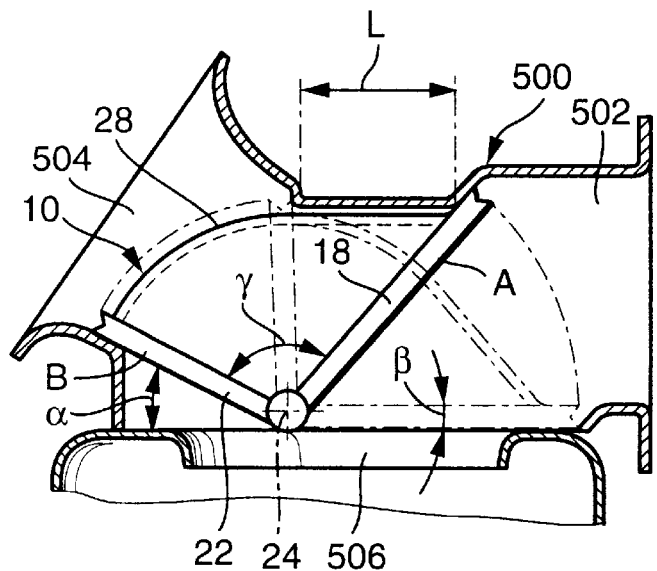
FIG. 8 is a partial cross-sectional view of an air intake housing, having an air flap according to the invention.
Figure 10:
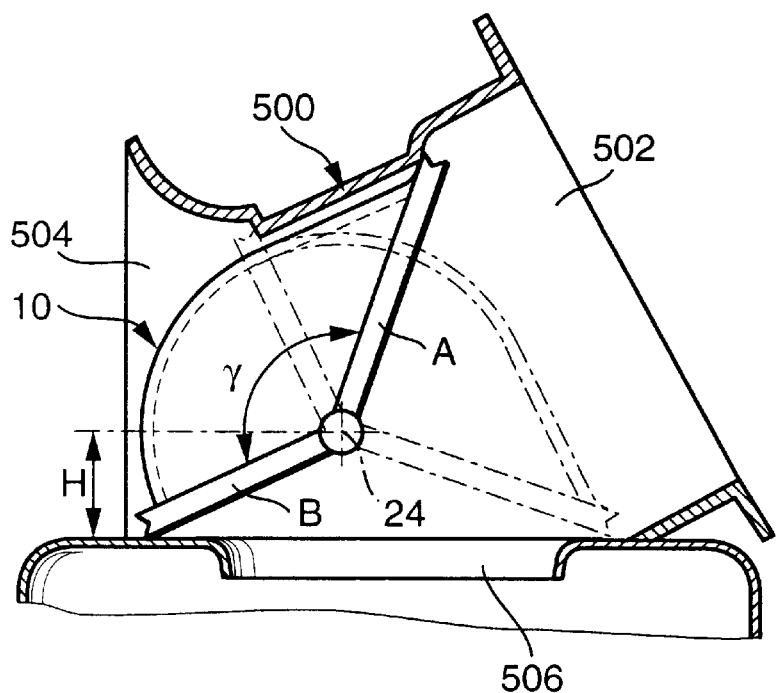
FIG. 10 is a partial cross-sectional view of an air intake housing, having an air flap according to the invention.
Figure 11:
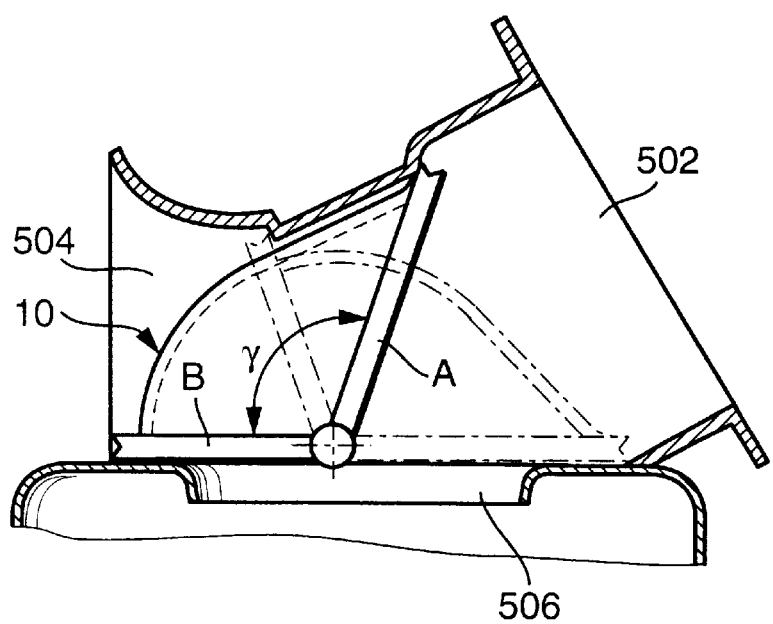
FIG. 11 is a partial cross-sectional view of an air intake housing, having an air flap according to the invention.

In the exemplary embodiments of FIGS. 8, 10 and 11 an air flap according to the first embodiment shown in FIGS. 1 to 3 is used. The air flap 10 may be modified to meet the structural conditions by changing the angle γ between the endpieces 16 and 20 or 18 and 22 of the edges 12 and 14. The size of the areas A and B can also be appropriately adjusted as needed. The pivot axis 24 may be placed, for example, in the plane of the intake opening 506, as shown in FIGS. 8 and 11. Alternatively, the axis 24 may be located at a distance H above this plane, as shown in FIG. 10. The air flap 10 may also be designed to be adapted to the differently configured fresh-air inlet 502 or circulating-air inlet 504. At lease in some regions, the shut-off surface 28 may be designed so that, for example, in the open position of the fresh-air inlet 502, as illustrated in FIG. 9, the section 36 of the air flap bears against the housing wall 508 in a manner favorable for air flow.

Figure 12:
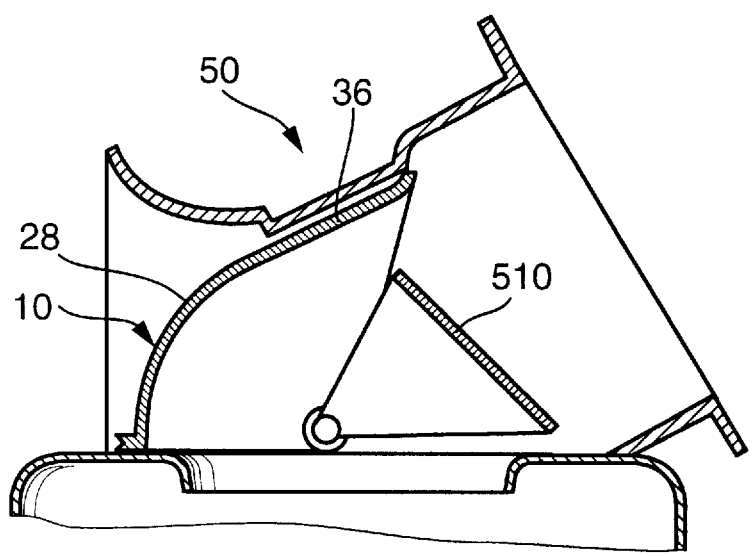
FIG. 12 is a partial cross-sectional view of an air intake housing, having an air flap according to the invention.

FIG. 12 shows the combination of an air flap 10 according to the invention being used as a circulating-air/fresh-air flap with a dynamic pressure flap 510. The air falp 51 is also referred to as an air speed pressure flap or a ram pressure flap. The air flap 10 is designed and shaped here so that, when the dynamic pressure flap 510 is in its open position, the pressure flap 510 rests against the inside of the section 36 of the shut-off surface 28 of the air flap 10. As a result, fresh air can then flow unimpeded in a manner favorable for flow, thereby reducing air flow noises.

Figure 13:
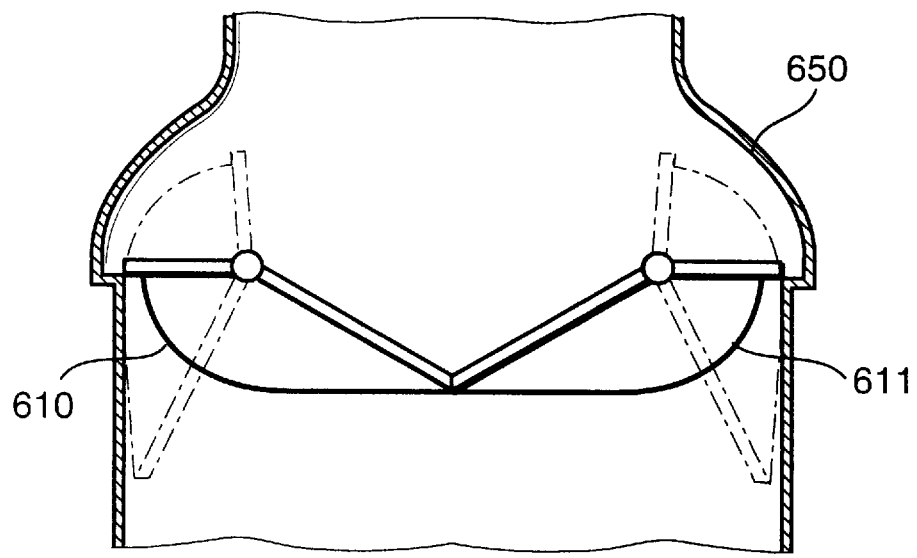
FIG. 13 is a partial cross-sectional view of an air-guiding duct having two interacting air flaps according to the present invention.

FIG. 13 illustrates the use of two air flaps 610 and 611 according to the invention. The air flaps 610 and 611 are positioned diametrically opposed to one another in an air duct 650. The open position of the flaps 610, 611 is illustrated by the dashed lines. The flaps 610, 611 rest against the wall of the air duct 650 in a manner favorable for flow. When the flaps 610, 611 are in their closed position the flaps operate together to close the cross section of the air duct 650.

Figure 14:
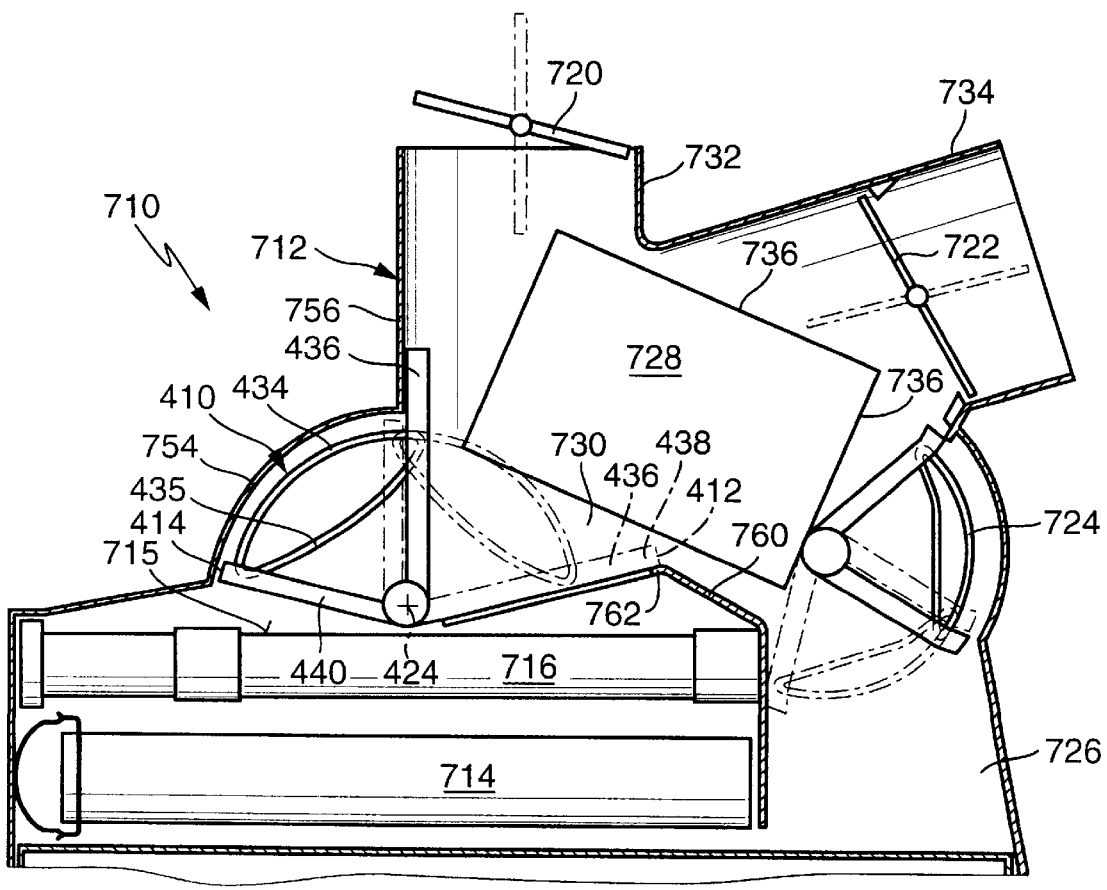
FIG. 14 shows the air flap of FIG. 7 arranged in a vehicle air conditioning system.

A further use for an air flap according to the present invention is shown in FIG. 14. A heating or air conditioning system 710 (partially illustrated) has a housing 712 through which a fan (not shown) moves air. The fresh air or circulating air flows through an air filter (not shown), an evaporator (provided in the case of an air conditioning system and likewise not illustrated), a heat exchanger 714 for the heater, and optionally an additional heating element 716, which may also form one unit together with the heat exchanger 714 for the heater. In addition, air flaps 410, 720, 722 and 724 are provided. The cold air produced by the evaporator may flow past the heating elements 714 and 716 via a cold-air bypass 726. Hot air is produced when air flows through the heating elements 714, 716. The hot air emerges from an air outlet side 715 of the heating element 716 and flows through a hot-air opening 730 into an air-mixing space 728. In the air-mixing space 728 the cold air is mixed with air heated in the heating elements 714, 716. Branching off from the air-mixing space 728 are a defrosting air duct 732, an air duct 734 to a group of central nozzles and an air duct 736 to a foot well. The defrosting air duct 732 can be shut off by the air flap 720, the air duct 734 to the central nozzles can be blocked by the air flap 722 and the foot well air duct 736 can be blocked by a further flap (not illustrated). These flaps can also be designed as conventional, flat pivoting flaps.

The air flap 410 is arranged in the housing 712 in such a manner that the pivot axis 424 is positioned in the region of the air outlet side 715 of the heating elements 714, 716. In an open position of the air flap 410, as is shown in FIG. 14, the circular cylindrical section 434 fits closely against a housing section 754 adapted to the circular cylindrical section 434. The planar region 436 of the air flap 410 rests flat against a housing wall 756 in the open position. In this open position, an opening of optimum size for the hot air is created. The air-directing element 435 exerts an air-guiding function for the hot air and conducts the hot air from that region of the heating element which is on the left in FIG. 14 into the air-mixing space 728. In this arrangement, the air flap 410 bears entirely against the housing 712 and does not interfere with the hot air flow.

In the closed position (illustrated by dashed lines) of the air flap 410, the sections 434 and 436 of the shut-off surface cover the hot-air opening 730. In this case, the second edge 414 is positioned with its sealing element 440 against an end of the housing wall 756. The planar section 436 rests against an end 762 of a housing section 760. The housing section 760 may also be used to hold the heating elements 714 and 716. The planar section 436 of the air flap 410 extends sufficiently far so that the planar section 436, or at least the sealing element 438 of the first, outer edge 412, rests on the end 762. The extension of the planar section 436 depends on the extent to which the end 762 of the housing section 760 is drawn into the region of the hot air flow. In the closed position of the air flap 410, essentially the entire air outlet side of the heating element 716 is covered. The outlet is covered by the air flap 410 on the one hand and the housing section 754 on the other hand, so that hot air is no longer able to pass into the air-mixing space 728.

The cold-air bypass flap 724 for shutting off the cold-air bypass duct 726 in FIG. 14, may be designed similarly to the air flap 410. Use of a common design enables a saving on structural space.

Figure 15:
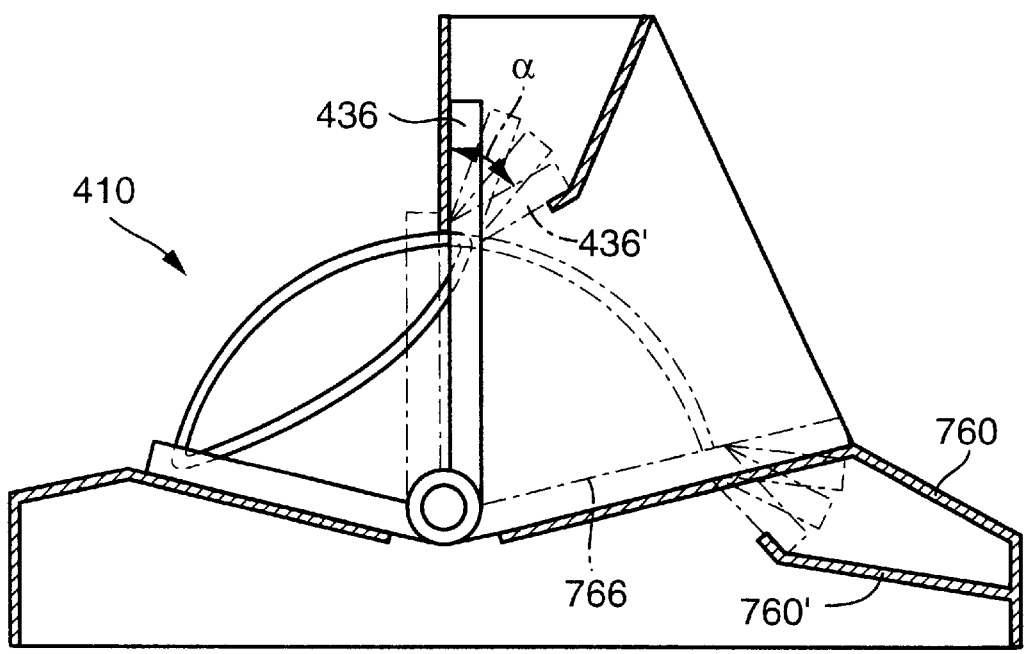
FIG. 15 shows further embodiments of the air flap of FIG. 7 according to the present invention.

FIG. 15 illustrates three further embodiments of the air flap 410. The different embodiments shown in FIG. 15 differ with respect to the value of an angle α between the planar section, 436 shown in FIG. 15, and the planar section 436 shown in FIG. 7. It is preferable to provide a planar section 436 angled as shown in FIG. 15 if the housing section 760 is of corresponding design. For example, this is shown by reference numeral 760'. The air flap 410 is able to close at the same angle of rotation despite the fact that the direction of the housing section 760' is changed. The closed position of the air flap 410 is indicated in FIG. 15 by the dashed line 766. Therefore, by modifying the design of the air flap 410 and of the housing section 760, 760' the guiding of the hot air may be improved. In particular, housing shapes that may be required for structural reasons can be realized with the use of similar shapes of the air flap 410.

The entire disclosure of the priority documents, German Patent Application Nos. 199 58 844.9 and 100 53 814.2, is incorporated by reference herein.

What is claimed is:

1. An air flap for a ventilation, heating or air conditioning system of a motor vehicle, the air flap comprising:
   a pivotable blocking surface for blocking air flow, defined by said surface having first and second edges, said surface having a vaulted profile and each edge including a 1st and 2nd pair of endpieces, the 1st pair of endpieces adjoining each other at a pivot axis and ditto to thereby form a frame; and
   wherein a first area defined by the first edge and the pivot axis is greater than a second area defined by the second edge and the pivot axis.

2. The air flap of claim 1, further comprising side walls positioned on opposite sides of the blocking surface.

3. The air flap of claim 1, wherein the blocking surface includes a curved region for distributing air.

4. The air flap of claim 3, wherein the curved region is generally in the shape of a portion of a cylinder.

5. The air flap of claim 3, wherein the curved region is in the shape of a quadrant of a sphere.

6. The air flap of claim 1, wherein the air flap pivots between an open and closed position, and, wherein in the open position at least part of the blocking surface fits into a similarly shaped section of the ventilation system.

7. The air flap of claim 1, wherein at least one of the first and second edges is non-planar.

8. The air flap of claim 3, wherein the blocking surface further comprises a planar region connected to the curved region and extending away from the pivot axis.

9. The air of claim 8, wherein the planar region extends away from the pivot axis in a radial direction.

10. The air flap of claim 1, wherein the edges of the frame further comprise sealing elements which extend away from the pivot axis in a radial direction.

11. A system for guiding air in a ventilation, heating or air conditioning system of a motor vehicle, comprising:
    an air guiding housing; and
    an air flap comprising a pivotable blocking surface for blocking air flow, defined by a frame having first and second edges connected to the surface, said first and second edges having a vaulted profile and each edge including a pair of endpieces, each endpiece adjoining one of the pair of endpieces of the other edge at a pivot axis for the surface to thereby form the frame; wherein a first area defined by the first edge and the pivot axis is greater than a second area defined by the second edge and the pivot axis; and
    wherein the air flap is mounted rotatably in the air-guiding housing to form a mixing flap for selectively closing off air flow.

12. A system as claimed in claim 11, wherein the system further comprises a heat exchanger, and the air flap is positioned so that the pivot axis lies on the air outlet side of the heat exchanger.

13. A system as claimed in claim 11, wherein the air-guide housing comprises a circulating air inlet.

14. A system as claimed in claim 11, wherein the air-guide housing comprises a fresh-air inlet.

* * * * *